(12) United States Patent
Christensen et al.

(10) Patent No.: US 7,229,032 B1
(45) Date of Patent: Jun. 12, 2007

(54) IRRIGATION DRIVE UNIT

(75) Inventors: Dale A. Christensen, Arlington, NE (US); Ricky D. McGee, Gretna, NE (US)

(73) Assignee: Valmont Industries, Inc., Valley, NE (US)

( * ) Notice: Subject to any disclaimer, the term of this patent is extended or adjusted under 35 U.S.C. 154(b) by 393 days.

(21) Appl. No.: 10/786,664

(22) Filed: Feb. 25, 2004

(51) Int. Cl.
*B05B 3/00* (2006.01)
(52) U.S. Cl. ..................... 239/744; 239/728; 239/737
(58) Field of Classification Search ................ 239/728, 239/735, 737, 743, 744, 726
See application file for complete search history.

(56) References Cited

U.S. PATENT DOCUMENTS 6,131,833 A * 10/2000 Chapman ................... 239/728

\* cited by examiner

Primary Examiner—Christopher Kim

(74) Attorney, Agent, or Firm—Thomte, Mazour & Niebergall; Dennis L. Thomte

(57) ABSTRACT

A drive unit for a self-propelled irrigation system including an elongated pipeline supported upon a plurality of spaced-apart drive units. Each of the drive units includes a generally transversely extending base beam having first and second ends. A first drive assembly is pivotally connected to the base beam adjacent the first end thereof and a second drive assembly is pivotally connected to the base beam adjacent the second end thereof. Each of the first and second drive assemblies includes an elongated support member pivotally connected, about a generally horizontal axis, which is generally transverse to the longitudinal axis of the base beam, to the base beam adjacent the first end thereof. First and second driven wheels are rotatably mounted on the elongated support member adjacent the ends thereof. The driven wheels are driven by an electric motor and gearbox arrangement.

2 Claims, 5 Drawing Sheets

IRRIGATION DRIVE UNIT

BACKGROUND OF THE INVENTION

1. Field of the Invention

This invention relates to an irrigation drive unit and more particularly to an irrigation drive unit having increased traction and flotation. More particularly the irrigation drive unit has increased traction and flotation due to providing an extra set of driven wheels thereon.

2. Description of the Related Art

Self-propelled irrigation systems or mechanized irrigation systems such as lateral move irrigation systems, center pivot irrigation systems, and corner irrigation systems normally utilize a plurality of spaced-apart drive units or towers which support an elongated irrigation pipeline which moves over the area to be irrigated. In the past, most prior art drive units comprise an elongated base beam which is disposed transversely to the longitudinal axis of the pipeline with a drive wheel at the opposite ends of the base beam. In some prior art designs, three or more drive wheels have been rigidly attached to the base beam. A tower structure extends upwardly from the base beam to the pipeline. The number of tires or wheels used on a drive unit relates directly to the weight distribution. The prior art systems do not allow the driven wheels to pivot over uneven terrain or when the drive wheels cross ridges which causes inconsistent weight distribution. Traction loss and rutting can appear if all the driven wheels are unable to contact the ground with approximately equal weight distribution.

SUMMARY OF THE INVENTION

A self-propelled irrigation system includes an elongated pipeline supported upon a plurality of spaced-apart drive units. At least one of the drive units, and preferably all the drive units, includes a transversely extending base beam having first and second ends. A first drive assembly is pivotally connected to the base beam adjacent the first end thereof and a second drive assembly is pivotally connected to the base beam adjacent the second end thereof. Each of the first and second drive assemblies includes: (a) an elongated support member, having first and second ends, pivotally connected, about a generally horizontal axis which is generally transverse to the longitudinal axis of the base beam, to the base beam adjacent the first end thereof; (b) a first driven wheel rotatably mounted on the first elongated support member adjacent the first end thereof; and (c) a second drive wheel rotatably mounted on the first elongated support member adjacent the second end thereof. Thus, the drive unit has first and second pairs of wheels which are pivotally mounted on opposite ends of the base beam so that the drive assemblies can pivot to allow the load to be shared between all the wheels. Each drive assembly is preferably supplied with a drive motor and two gearboxes.

It is therefore a principal object of the invention to provide an improved irrigation drive unit.

Still another object of the invention is to provide an improved irrigation drive unit for a self-propelled irrigation system such as a lateral move irrigation system, a center pivot irrigation system, or a corner irrigation system.

Still another object of the invention is to provide an improved irrigation drive unit which provides approximately equal torque to four wheels.

Yet another object of the invention is to provide an improved irrigation drive unit including a pair of drive assemblies pivotally secured to the base beam of the drive unit with each of the drive assemblies including a pair of wheels.

These and other objects will be apparent to those skilled in the art.

DETAILED DESCRIPTION OF THE INVENTION

Figure 1:
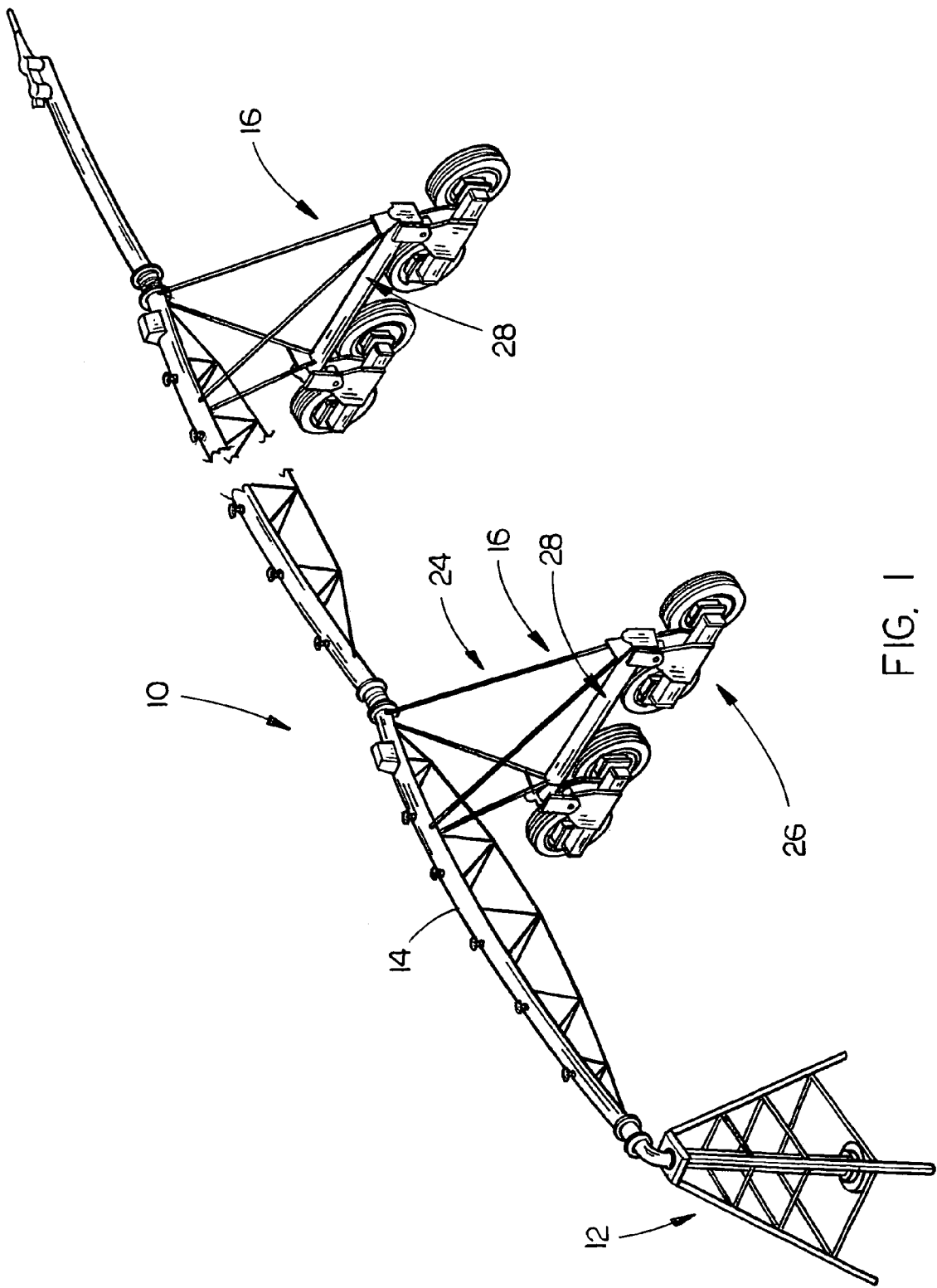
FIG. 1 is a partial perspective view of a mechanized or self-propelled irrigation system having the drive units of this invention provided thereon.

The numeral 10 refers to a prior art self-propelled or mechanized irrigation system of the center pivot type. System 10 includes a center pivot structure 12 having a water conduit or pipeline 14 extending therefrom which is supported by a plurality of spaced-apart drive units or towers 16. A vast majority of the prior art drive units include a generally horizontally disposed base beam having a pair of driven wheels which are driven by an electric motor or the like through a suitable gearbox mechanism. The base beam is rigidly secured to the pipeline 14 by a tower structure 24. Although the driven wheels of the prior art are rotatably mounted on the base beam, they are not pivotally secured thereto.

The instant invention is referred to by the reference numeral 26 and which includes a modified base beam 28 having ends 30 and 32. Base beam 28 is generally horizontally disposed with its longitudinal axis being disposed generally transversely to the longitudinal axis of the pipeline 14. End 30 of base beam 28 has a bracket assembly 34 secured thereto while end 32 of base beam 28 has a bracket assembly 36 secured thereto.

Drive assemblies 38 and 40 include bracket assemblies 42 and 44 which are pivotally secured to bracket assemblies 34 and 36 by pivot pins 46 and 48, respectively. As seen, pivot pins 46 and 48 are disposed generally transversely with respect to base beam 28.

The numerals 50 and 52 refer to elongated supports which have the bracket assemblies 42 and 44 secured thereto, respectively. Wheel mounting plates 54 and 56 are secured to the opposite ends of support 50 in the manner illustrated in the drawings so as to be laterally offset from the support 50. Driven wheels 58 and 60 are rotatably secured to mounting plates 54 and 56, respectively. The opposite ends of support 52 have wheel mounting plates 62 and 64 secured thereto, respectively. Driven wheels 66 and 68 are rotatably secured to wheel mounting plates 62 and 64, respectively.

Preferably, wheels 58 and 60 are driven by an electric motor 70 and gearboxes 72 and 74, respectively. Similarly, wheels 66 and 68 are driven by electric motor 76 and gearboxes 78 and 80.

Figure 2:
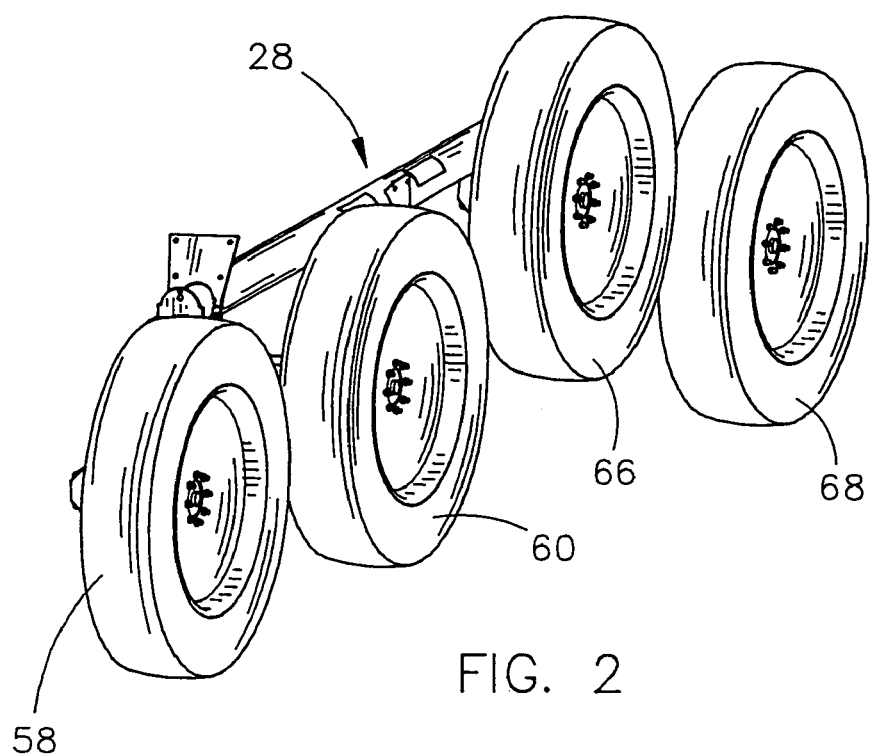
FIG. 2 is a partial perspective view of the improved drive unit of this invention.
Figure 3:
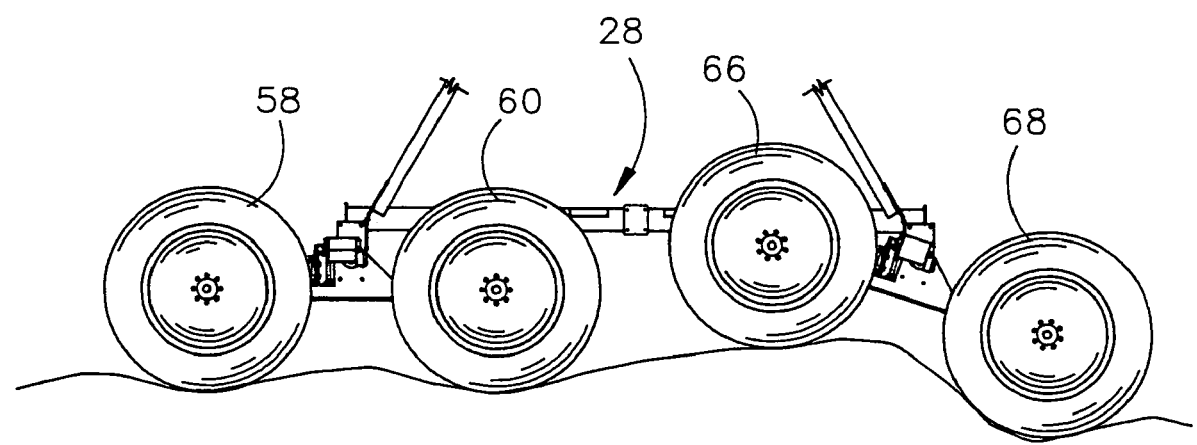
FIG. 3 is a partial side view of the improved drive unit of this invention.
Figure 4:
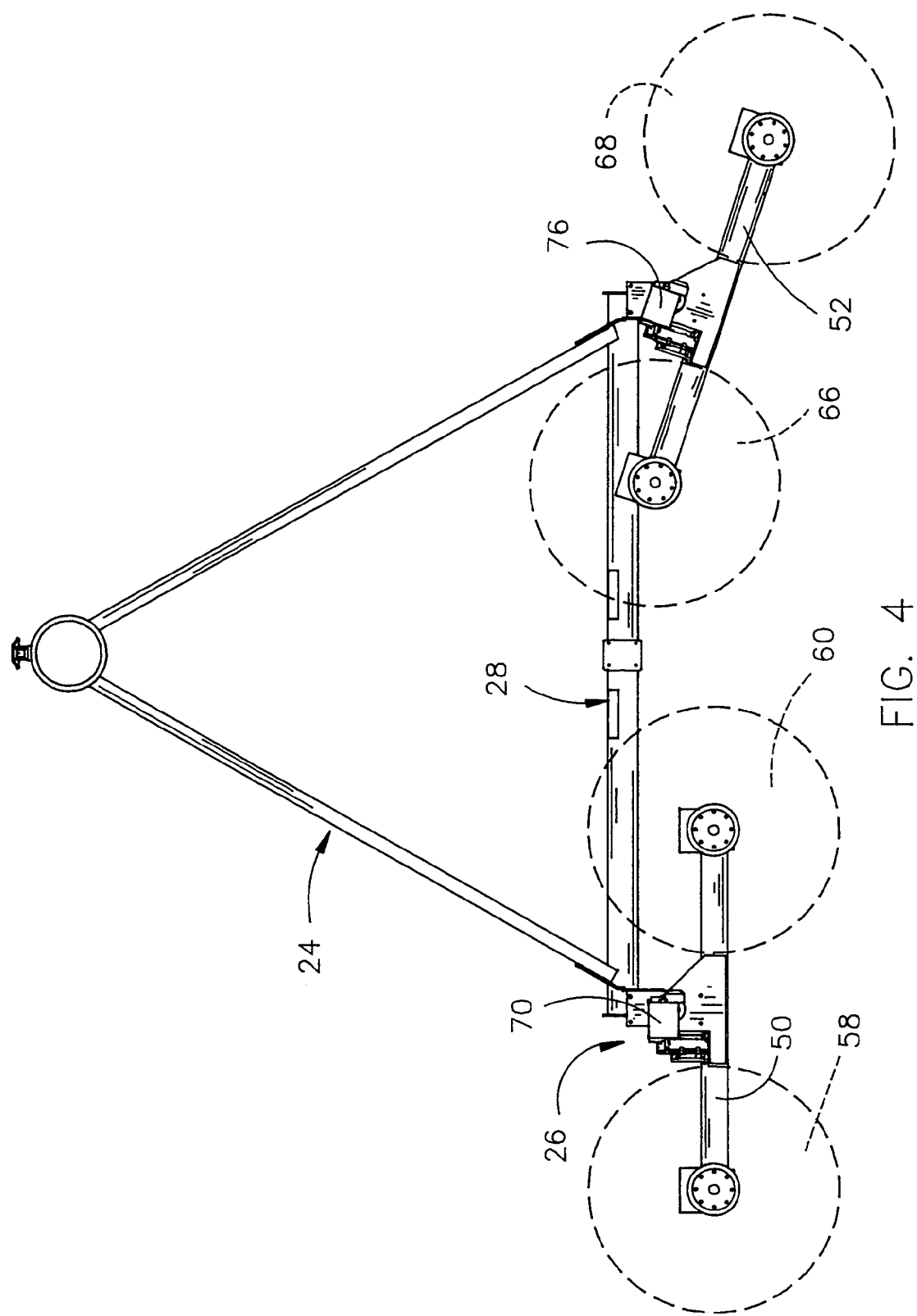
FIG. 4 is a side elevational view of the improved drive unit of this invention.
Figure 5:
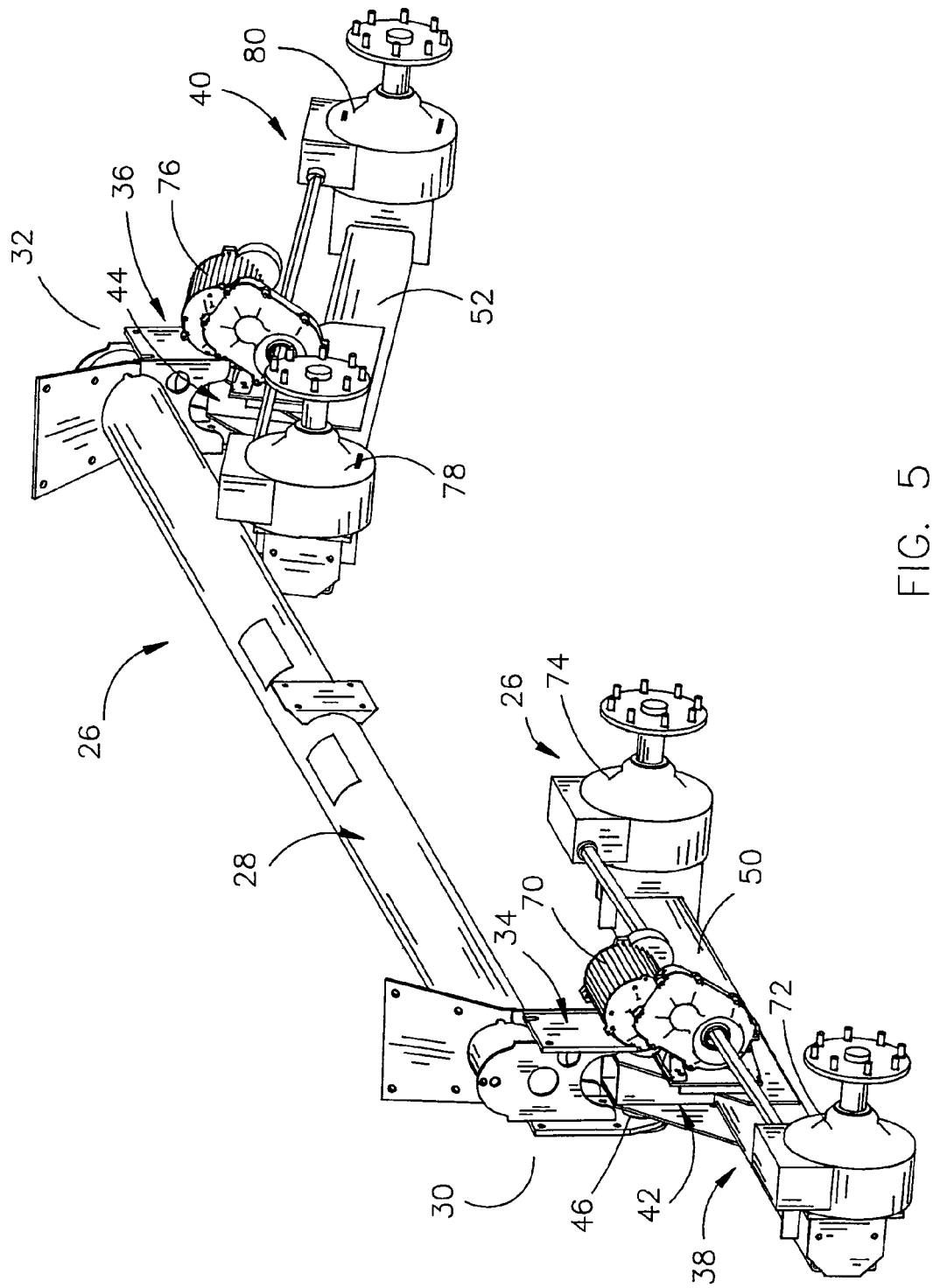
FIG. 5 is a partial perspective view of the improved drive unit of this invention.
Figure 6:
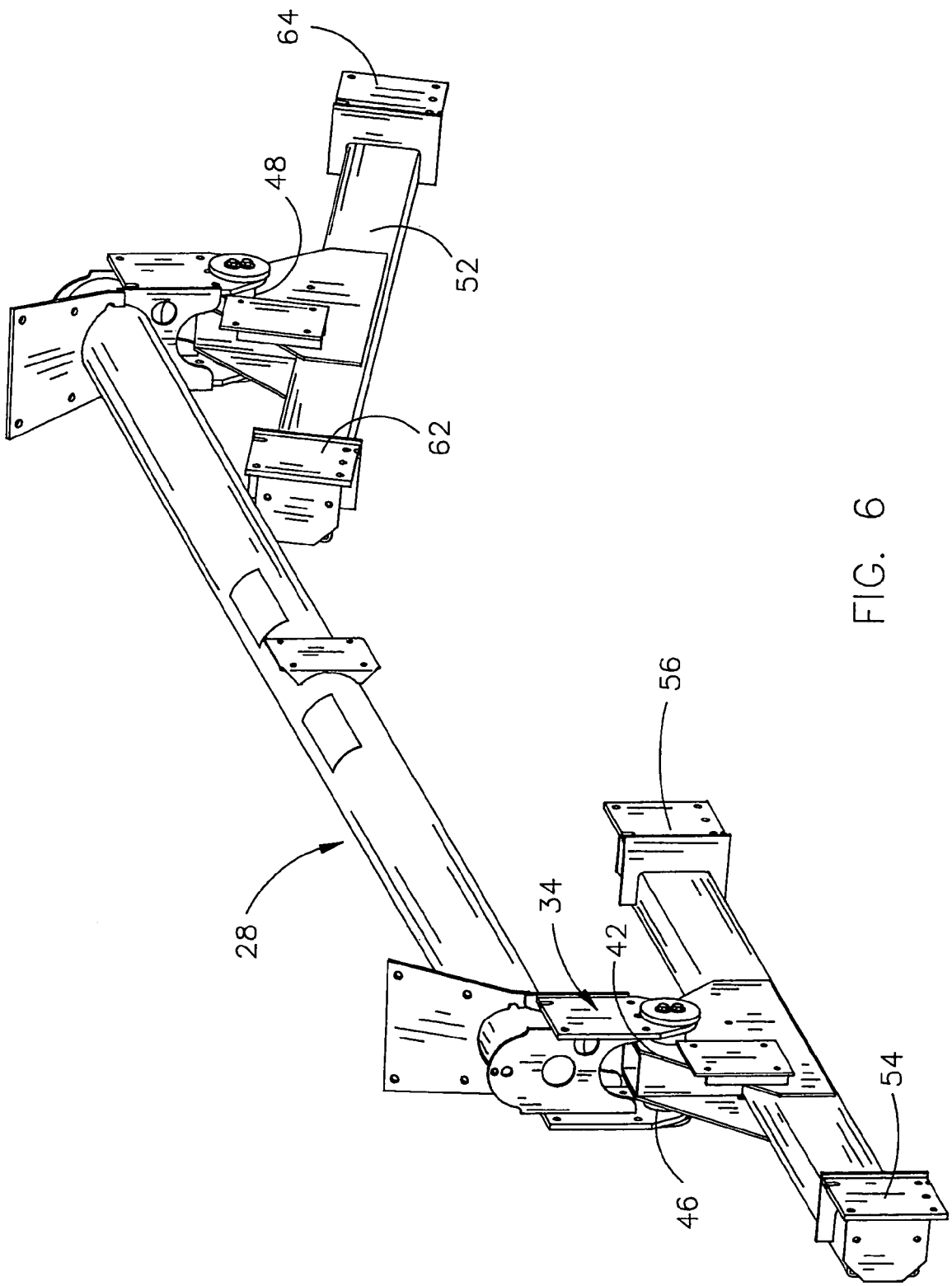
FIG. 6 is a partial perspective view of the improved drive unit of this invention without the drive motors, gearboxes and wheels.

As the drive unit 26 moves through the field, the pivotal connection of the pairs of wheels to the opposite ends of the base beam 28 enables the wheels to pivot to various positions relative to the base beam 28, such as seen in FIGS. 2, 3 and 4, so that each of the drive wheels maintains driving contact with the irregular terrain over which the unit may be passing. The pivotal arrangement of the pairs of wheels with respect to the base beam ensures that proper torque will be provided to all of the driven wheels. In the event of rough ground or change of elevation, the drive assembly is permitted to pivot to allow the load to be shared between the tires equally, as illustrated in the drawings. The approximate equal sharing of the load between the wheels enhances traction and reduced rutting. The in-line positioning of the drive wheels creates a single track in the field to minimize crop loss.

Thus it can be seen that the invention accomplishes at least all of its stated objectives

We claim:

1. In combination:
   a self-propelled irrigation system including an elongated pipeline supported upon a plurality of spaced-apart drive units;
   at least one of said drive units including a generally transversely extending base beam having first and second ends;
   a first in-line drive assembly pivotally connected to said base beam adjacent said first end thereof;
   a second in-line drive assembly pivotally connected to said base beam adjacent said second end thereof;
   each of said first and second drive assemblies including:
   (a) an elongated support member, having first and second ends, pivotally connected, about a generally horizontal axis which is generally transverse to the longitudinal axis of said base beam, to said base beam adjacent the associated end thereof;
   (b) a first driven wheel rotatably mounted on said first elongated support member adjacent said first end thereof;
   (c) and a second driven wheel rotatably mounted on said first elongated support member adjacent said second end thereof;
   said driven wheels being positioned in-line laterally of said base beam and laterally of said elongated support member.

2. In combination:
   a self-propelled irrigation system including an elongated pipeline supported upon a plurality of spaced-apart drive units;
   at least one of said drive units including a generally transversely extending base beam having first and second ends;
   a first in-line drive assembly pivotally connected to said base beam adjacent said first end thereof;
   a second in-line drive assembly pivotally connected to said base beam adjacent said second end thereof;
   each of said first and second drive assemblies including:
   (a) an elongated support member, having first and second ends, pivotally connected, about a generally horizontal axis which is generally transverse to the longitudinal axis of said base beam, to said base beam adjacent the associated end thereof;
   (b) a first driven wheel rotatably mounted on said first elongated support member adjacent said first end thereof;
   (c) and a second driven wheel rotatably mounted on said first elongated support member adjacent said second end thereof;
   each of said first and second drive assemblies including a drive motor and two gearboxes operatively connected to said driven wheels.

\* \* \* \* \*